Patented Mar. 6, 1923.

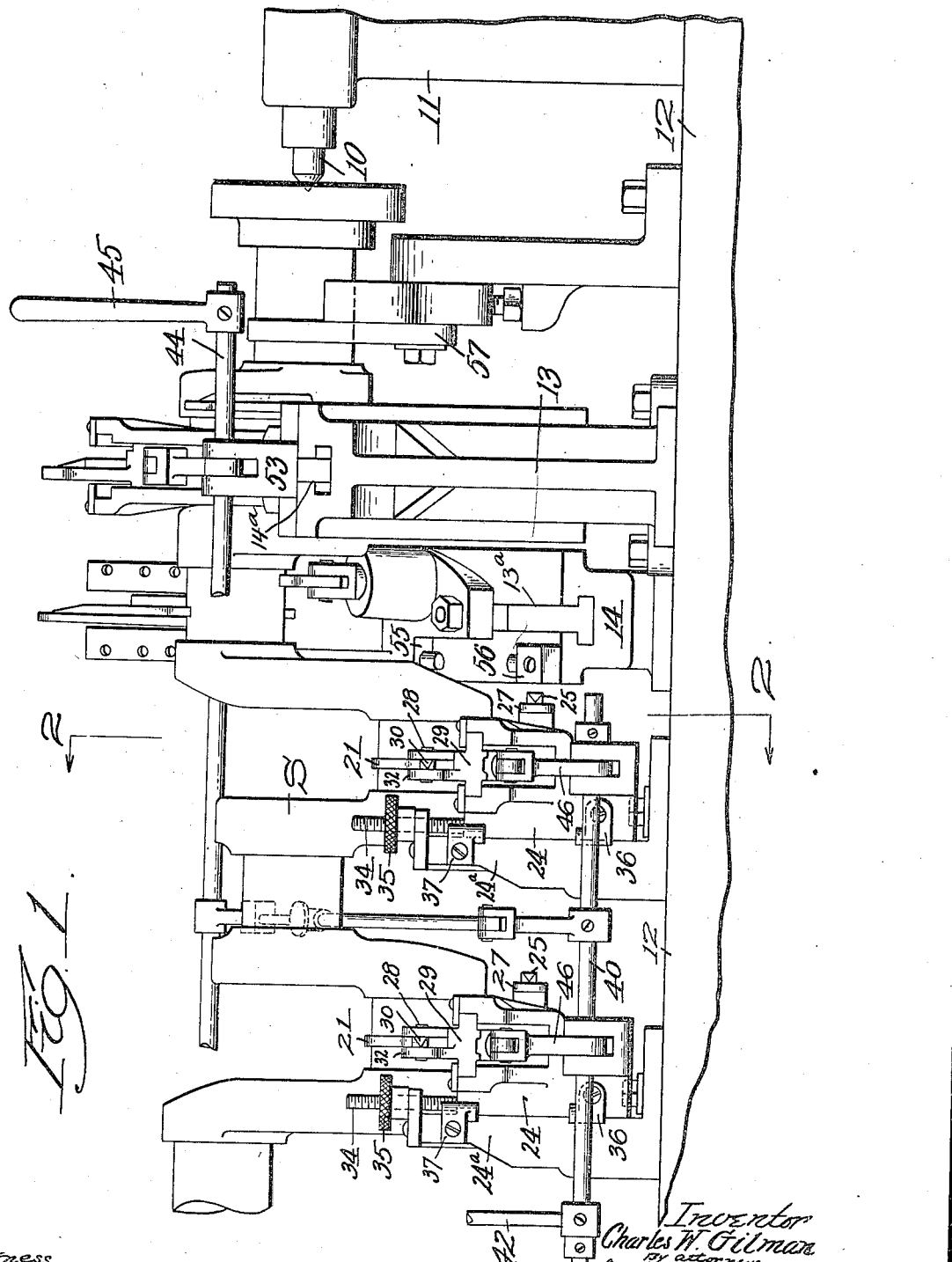

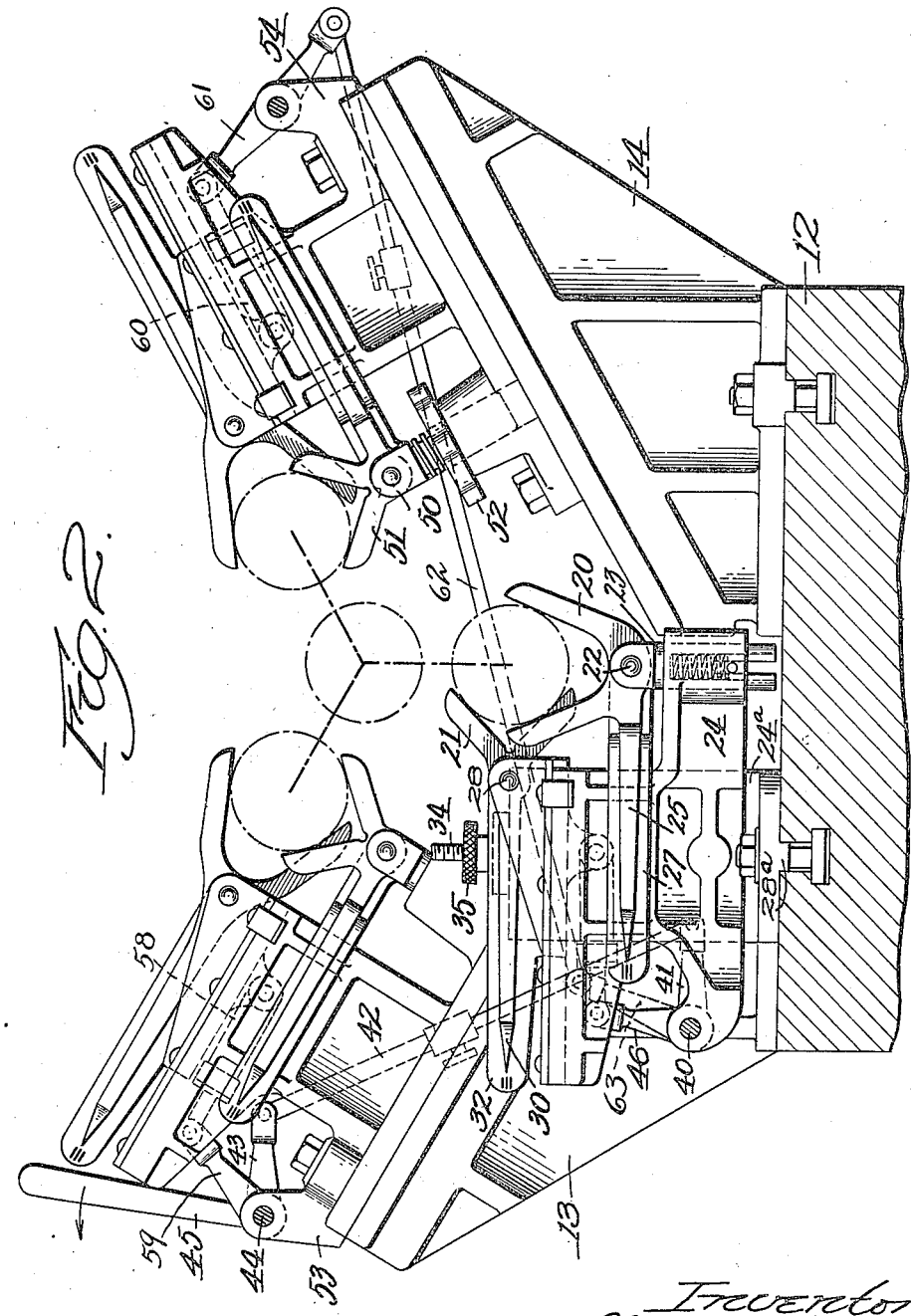

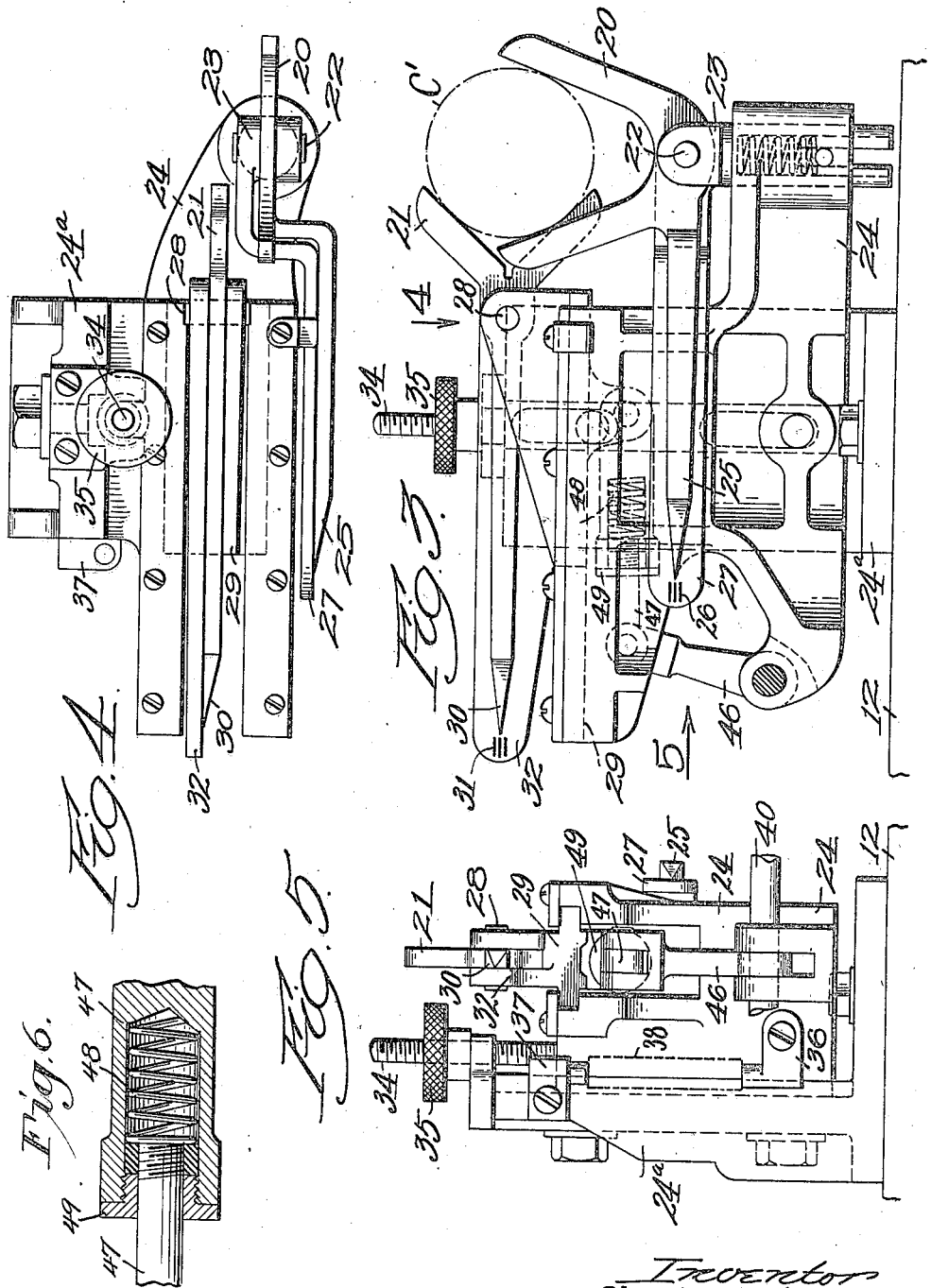

1,447,346

UNITED STATES PATENT OFFICE.

CHARLES W. GILMAN, OF WORCESTER, MASSACHUSETTS, ASSIGNOR TO WYMAN-GORDON COMPANY, A CORPORATION OF MASSACHUSETTS.

INDICATING MACHINE.

Application filed December 2, 1919. Serial No. 342,010.

*To all whom it may concern:*

Be it known that I, CHARLES W. GILMAN, a citizen of the United States, residing at Worcester, in the county of Worcester and State of Massachusetts, have invented a new and useful Indicating Machine, of which the following is a specification.

This invention relates to an indicating machine, particularly designed for use in testing crank shaft forgings having a plurality of cranks formed thereon.

For the production of perfect crank shafts, the crank shaft forgings must be kept within definite narrow limits of variation, both as to the relative angular positions of the cranks and also as to the throw of each crank.

It is the general object of my invention to provide a machine by which these two factors may be simultaneously indicated for a plurality of cranks, securing accurate indications combined with ease and rapidity of operation.

With this general object in view, one feature of my invention relates to the provision of a plurality of movably mounted indicating devices, in combination with means for simultaneously rendering said devices operative.

Other important features of my invention relate to the provision of adjustment means by which the position of the crank shaft in the machine may be varied, and to special provision for ready and accurate setting of the several parts of the machine for crank shafts of different dimensions.

My invention further relates to certain arrangements and combinations of parts which will be hereinafter described and more particularly pointed out in the appended claims.

A preferred form of my invention is shown in the drawings, in which—

Fig. 1 is a side elevation of a portion of my improved machine as used on crank-shafts for six-cylinder motors;

Fig. 2 is a transverse sectional elevation taken along the line 2—2 in Fig. 1;

Fig. 3 is a side elevation of one set of indicating devices,

Figs. 4 and 5 are a plan view and a front elevation respectively of the mechanism shown in Fig. 3, looking in the direction of the arrows 4 and 5 in said figure, and Fig. 6 is a detail sectional view to be described.

Referring to the drawings, I have shown my invention embodied in a machine for indicating a six-throw crank shaft S which is supported on centers 10, only one of which is shown. The centers 10 are carried by standards 11 mounted upon a base 12 upon which the several parts of the machine are assembled.

Pairs of indicating devices are mounted upon separate stands some of which are secured to the base 12 and others to inclined brackets 13 or 14 bolted to the base 12. These brackets and stands are all adjustable longitudinally along T slots in the base 12 (Fig. 2) to adapt the mechanism to crank shafts of different lengths.

The several sets of indicating devices are similar in their general features, and I will first specifically describe one of the two sets of indicating devices which operate upon the lower cranks.

Referring to Figs. 3, 4 and 5, a forked indicating lever 20 is used to determine the angular position of the crank, and a second forked indicating lever 21 is used to determine the throw of the crank.

The lever 20 is pivoted at 22 to a plunger 23 yieldingly mounted to move vertically in a block 24 secured to a stand 24ª which is bolted in adjusted position on the base 12. The lever 20 is extended at 25 to form a pointer cooperating with limit marks or graduations 26 formed on a laterally extended plate 27 secured to the upper end of the plunger 23.

A rib 28ª (Fig. 2) formed on the lower face of the stand 24ª is fitted in a longitudinal slot in the base 12 and the rib is so positioned that the axis of the pivot 22 will be directly below the axis of the center 10.

If a crank, as C', is correctly positioned directly below the axis of the center, the pointer 25 will coincide with the middle graduation 26 on the plate 27. The outside graduations 26 indicate the limits of variation permitted.

The forked lever 21 is pivoted at 28 to a slide 29 mounted in guideways in the upper portion of the block 24 and one arm of the lever 21 is extended to form a pointer 30 cooperating with graduations 31 on a plate 32 carried by the slide 29.

The block 24 is adjustable vertically in guideways in the stand 24ª previously described and an adjusting screw 34 and nut 35 are provided for raising and lowering the block. A stop member 36 is fixed to the block 24 and a second stop member 37 is fixed to the stand 24ª. These stop-members are preferably hardened and are so disposed that the distance between the stops will correspond exactly to the vertical distance from the axis of the centers 10 to the axis of the pivot 28. Gauge blocks 38 of exact lengths are conveniently used for quickly setting the several indicating devices to their proper position, similar stop members being provided on each set of indicating devices, as will be hereinafter described.

If the block 24 is accurately positioned vertically for a particular crank-shaft and the crank C' is at the correct distance from the center of the shaft, the pointer 30 will coincide with the middle graduation 31 on the plate 32, while the outside graduations 31 indicate the permissible variations.

A shaft 40 is rotatably mounted in bearings in the block 24, and is provided with an arm 41 (Fig. 2) connected by a telescoping adjustable link 42 with an arm 43 on a shaft 44, rotatably mounted and provided with a handle 45. The shaft 40 (Fig. 5) is connected by an arm 46 and link 47 (Fig. 3) to the slide 29. The link 47 (Fig. 6) is formed in two parts, one part having a recess for a spring 48 which normally forces the adjacent shouldered end of the other part outward against a collar 49 threaded in the first part.

I thus secure a link of normally fixed length but capable of being yieldingly shortened when further movement of the slide 29 is prevented by engagement of the lever 21 with the crank shaft in the machine.

The indicating unit shown in Figs. 3, 4 and 5 thus provides for accurate indications of both the angular position and the throw of one crank, and also provides for adjustment of the unit to operate with shafts of different throw and of different axial spacing.

A complete machine for a six-throw crank shaft requires two indicating units such as has been described for the two lower cranks, and two angularly disposed units at each side of the center for the remaining cranks. The other units are similar in many respects to the unit already described. In these inclined units, however, the forked levers mounted below the crank upon the spring pressed plungers indicate the throw of the crank, rather than the angular position, and the forked levers mounted upon the longitudinally movable slides indicate the angular positions of the cranks with reference to each other.

All of the slides are connected directly or indirectly to the shaft 44 as hereinafter described, so that the slides may all be moved simultaneously toward or away from the work.

One important difference in construction appears, however, in the right hand unit in Fig. 2 in which the plunger 50 which supports the lower forked lever 51 is vertically adjustable by means of a large nut 52 instead of being spring-pressed vertically, as in Fig. 3. The lever 51 supported by the plunger 50 is used to give a fixed position from which measurements may be taken, and the vertical position of the lever 51 may be adjusted by the nut 52 so as to bring the several pointers indicating angular position as near as possible to the middle position on their respective scales. The crank which is found the nearest to exact central position is then permanently marked so that it may be used as a starting point in finishing the shaft in a lathe or grinding machine.

The stands 53 and 54 for the inclined indicating units are adjustable along guideways in the inclined faces of the brackets 13 and 14 previously described and are secured in position by bolts extending into T slots 13ª and 14ª (Fig. 1). These stands and brackets are also provided with stops 55 and 56 corresponding to the stops 36 and 37 previously described, and these stops are arranged for use with the same gauge block to position each lower indicating lever at such distance from the axis that it will indicate the correct throw for a selected crank shaft.

Forked guides 57 (Fig. 1) may be provided to assist in locating the crank shaft upon the centers 10.

The slide in the stand 53 is connected by a link 58 and arm 59 to the shaft 44 and the slide in the stand 54 is connected by a link 60, lever 61, link 62, arms 63 and 41 on the shaft 40, and link 42 and arm 43 to the shaft 44.

Having thus described my invention, it will be seen that I have provided an indicating machine adapted to test all of the cranks of a given crank shaft at a single operation, thus giving simultaneous indication of both the throw and the angular position of every crank in the shaft, and it will be evident that the number and arrangement of the indicating units may be varied to suit different sizes and styles of shafts.

It will also be evident that other changes and modifications can be made in my invention by those skilled in the art within the spirit and scope of my invention as set forth in the claims, and I do not wish to be otherwise limited to the details herein disclosed, but what I claim is:

1. A machine for indicating the throw and relative angular position of the cranks of a multiple crankshaft comprising a set of indicating devices permanently mounted in operative position for engagement with a crank, a second set of indicating devices movable to and from operative position for engagement with a second crank, and means to move said latter devices to engage said crank.

2. A machine for indicating the throw and relative angular position of the cranks of a multiple crankshaft comprising a set of indicating devices permanently mounted in operative position for engagement with a crank, a second set of indicating devices movable to and from operative position for engagement with a second crank, and a single manually operated member connected to move all of said latter devices simultaneously to engage said crank.

3. A machine for indicating the throw and relative angular position of the cranks of a multiple crankshaft comprising a set of indicating devices permanently mounted in operative position for engagement with a crank, a second set of indicating devices movable to and from operative position for engagement with a second crank, and means to move said latter devices to engage said crank, said means including yielding connections permitting different ranges of movement to different movable indicating devices.

4. A machine for indicating the throw and relative angular position of the cranks of a multiple crankshaft comprising a set of indicating devices permanently mounted in operative position for engagement with a crank, one of said devices being adjustable to vary the angular position of the work about its supporting axes in said machine, a second set of indicating devices movable to and from operative position for engagement with a second crank, and means to move said latter devices to engage said crank.

5. A machine for indicating the throw and relative angular position of the cranks of a multiple crankshaft having, in combination, a plurality of sets of indicating units each effective to indicate the throw and relative angular position of a different crank in said crankshaft when operatively engaged therewith, and means to render all of said units simultaneously operative to engage their respective cranks.

6. An indicating machine having, in combination a plurality of sets of indicating units each effective to indicate the throw and relative angular position of one of the cranks of a multiple crankshaft when operatively engaged therewith, means on one of said units effective to adjust the angular position of the crankshaft to be indicated about its supporting axis in said machine, and means to render said units operative to engage their respective cranks.

7. An indicating machine comprising work supporting means, a fixed pivot, an indicating device mounted on said fixed pivot for engagement with a crank, a plurality of yieldingly supported pivots, additional indicating devices mounted on said yieldingly supported pivots for engagement with other cranks, a set of indicating devices pivotally mounted on supports movable toward and from the work for engagement with their respective cranks, and means to move said supports to cause said movable indicating devices to operatively engage said cranks, said several devices being effective to indicate the throw and relative angular position of the cranks of a multiple crankshaft when operatively engaged therewith.

8. An indicating machine comprising work supporting means, an adjustable but normally fixed pivot, an indicating device mounted on said fixed pivot for engagement with a crank, a plurality of yieldingly supported pivots, additional indicating devices mounted on said yieldingly supported pivots for engagement with other cranks, a set of indicating devices pivotally mounted on supports movable toward and from the work for engagement with their respective cranks, means to move said supports to cause said movable indicating devices to operatively engage said cranks, said several devices being effective to indicate the throw and relative angular position of the cranks of a multiple crankshaft when operatively engaged therewith, and said fixed pivot being adjustable substantially tangentially with reference to the axis of the work.

9. A machine for indicating the throw and relative angular position of the cranks of a multiple crankshaft having, in combination, a plurality of sets of indicating devices for engagement with different cranks, said sets being angularly disposed relatively to each other, and means to render said indicating devices simultaneously operative to engage their respective cranks.

10. An indicating machine for crankshafts having a plurality of cranks comprising a pair of indicating devices for engagement with each crank, a plurality of slides, one device of each pair being mounted on one of said slides, and means to move all of said slides simultaneously to and from operative position thereby engaging said devices with their respective cranks.

11. An indicating machine for a six-throw crankshaft comprising means to support the work, devices for engagement with different cranks effective to simultaneously test the angular position and throw of each one of the cranks in their three angular positions, and means to render all of said devices operative to engage their respective cranks.

12. In an indicating machine, a plurality of indicating devices for engagement with different cranks of a multiple crankshaft, and actuating means effective to cause said devices to engage said cranks and to indicate the throw and relative angular position of the cranks engaged thereby, every indicating device having a pair of stops adapted to co-operate with a single gauge block for setting all of said devices uniformly.

13. An indicating machine having, in combination, a plurality of sets of indicating devices for engagement with different cranks of a multiple crank shaft, and means to cause such engagement and to render each set of devices effective to indicate the throw and relative angular position of the crank engaged thereby, and gauge means for setting said devices for a uniform selected throw.

In testimony whereof I have hereunto affixed my signature.

CHARLES W. GILMAN.